(12) United States Patent
Vanderwater et al.

(10) Patent No.: US 9,148,754 B2
(45) Date of Patent: Sep. 29, 2015

(54) CALCULATING AND BROADCASTING AN AREA'S POPULATION DENSITY BASED ON CELL SIGNAL

(71) Applicant: Google Inc., Mountain View, CA (US)

(72) Inventors: Kathryn Rose Vanderwater, Plainfield, IL (US); Frances Bordwell Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 13/958,273

(22) Filed: Aug. 2, 2013

(65) Prior Publication Data

US 2015/0172856 A1    Jun. 18, 2015

Related U.S. Application Data

(60) Provisional application No. 61/679,580, filed on Aug. 3, 2012.

(51) Int. Cl.
*H04W 24/00* (2009.01)
*H04W 4/02* (2009.01)
(52) U.S. Cl.
CPC ........................................ *H04W 4/02* (2013.01)
(58) Field of Classification Search
CPC ........ H04W 64/00; H04W 4/02; H04W 48/04
USPC ................................... 455/456.1, 456.6, 457
See application file for complete search history.

(56) References Cited

U.S. PATENT DOCUMENTS

2011/0143768 A1* 6/2011 Lane et al. ................. 455/456.1
2014/0278691 A1* 9/2014 Schenken ..................... 705/7.22

\* cited by examiner

*Primary Examiner* — Temica M Beamer
(74) *Attorney, Agent, or Firm* — Dority & Manning, P.A.

(57) ABSTRACT

The subject technology determines population density of an area in order to map one or more persons to smaller areas such as bathrooms, stores, and lines. Based on a user's current geolocation, the subject technology utilizes one or more nearby wireless signals transmitted from computing devices to determine a population density of an area near the user's geolocation. The signals from each device can include unique IDs for identifying the device associated with the ID. Mobile devices such as cell phones constantly broadcast a cell signal and/or other types of signals with unique identifiers. These signals are anonymized to protect any personal information associated with the mobile devices transmitting these signals while still being able associate a device to a respective signal. The subject technology therefore can determine an area's population density based on these anonymized signals by detecting one or more associated devices near the geolocation of the user.

25 Claims, 7 Drawing Sheets

CALCULATING AND BROADCASTING AN AREA'S POPULATION DENSITY BASED ON CELL SIGNAL

CROSS-REFERENCE TO RELATED APPLICATIONS

The present application claims the benefit of priority under 35 U.S.C. §119 from U.S. Provisional Patent Application Ser. No. 61/679,580 entitled "Calculating and Broadcasting an Area's Population Density based on Cell Signal," filed on Aug. 3, 2012, the disclosure of which is hereby incorporated by reference in its entirety for all purposes.

BACKGROUND

An online electronic map can display a geographic area. A user can view the online electronic map to locate points of interests.

SUMMARY

The subject technology provides for determining a population density of an area based at least on a geolocation of a user. The subject technology receives a geolocation shared by a user. An area of interest of the user is then determined in which the area of interest is determined, in part, by the geolocation shared by the user. The subject technology then determines one or more computing devices in proximity to the determined area of interest of the user based on one or more wireless signals transmitted from the one or more computing devices. Further, a population density of an area is determined near the determined area of interest of the user based on the determined one or more computing devices in proximity to the determined area of interest of the user. The population density of the area represents a level of activity by one or more persons.

Yet another aspect of the subject technology provides a system for determining a population density of an area based at least on a geolocation of a user. The system includes memory, one or more processors and one or more modules stored in memory and configured for execution by the one or more processors. The system includes a geolocation module configured to receive a geolocation shared by a user. The system includes an area of interest module configured to determine an area of interest of the user in which the area of interest is determined, in part, by the geolocation shared by the user. The area of interest includes a geographic area within a predetermined distance from the geolocation shared by the user. The system also includes a wireless signal detection module configured to determine one or more computing devices in proximity to the determined area of interest of the user based on one or more wireless signals transmitted from the one or more computing devices. The system further includes a population density processing module configured to determine a population density of an area near the determined area of interest of the user based on the determined one or more computing devices in proximity to the determined area of interest of the user in which the population density of the area represents a level of activity by one or more persons. The population density of the area indicates an estimated number of persons present in the area. Additionally, the system includes a graphical user interface (GUI) display module configured to provide for display an electronic map including the determined population density of the area near the determined area of interest of the user.

The subject technology further provides for receiving a geolocation shared by a user. An area of interest of the user is determined in which the area of interest is determined, in part, by the geolocation shared by the user. The subject technology determines one or more computing devices in proximity to the determined area of interest of the user based on one or more wireless signals transmitted from the one or more computing devices. The one or more wireless signals transmitted from the one or more computing devices includes at least one of a cellular signal, near field communication signal, and short wavelength radio signal. The subject technology determines a population density of an area near the determined area of interest of the user based on the determined one or more computing devices in proximity to the determined area of interest of the user. The population density of the area represents a level of activity by one or more persons. Further, the population density of the area indicates an estimated number of persons present in the area. The subject technology provides for display an electronic map including the determined population density of the area near the determined area of interest of the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
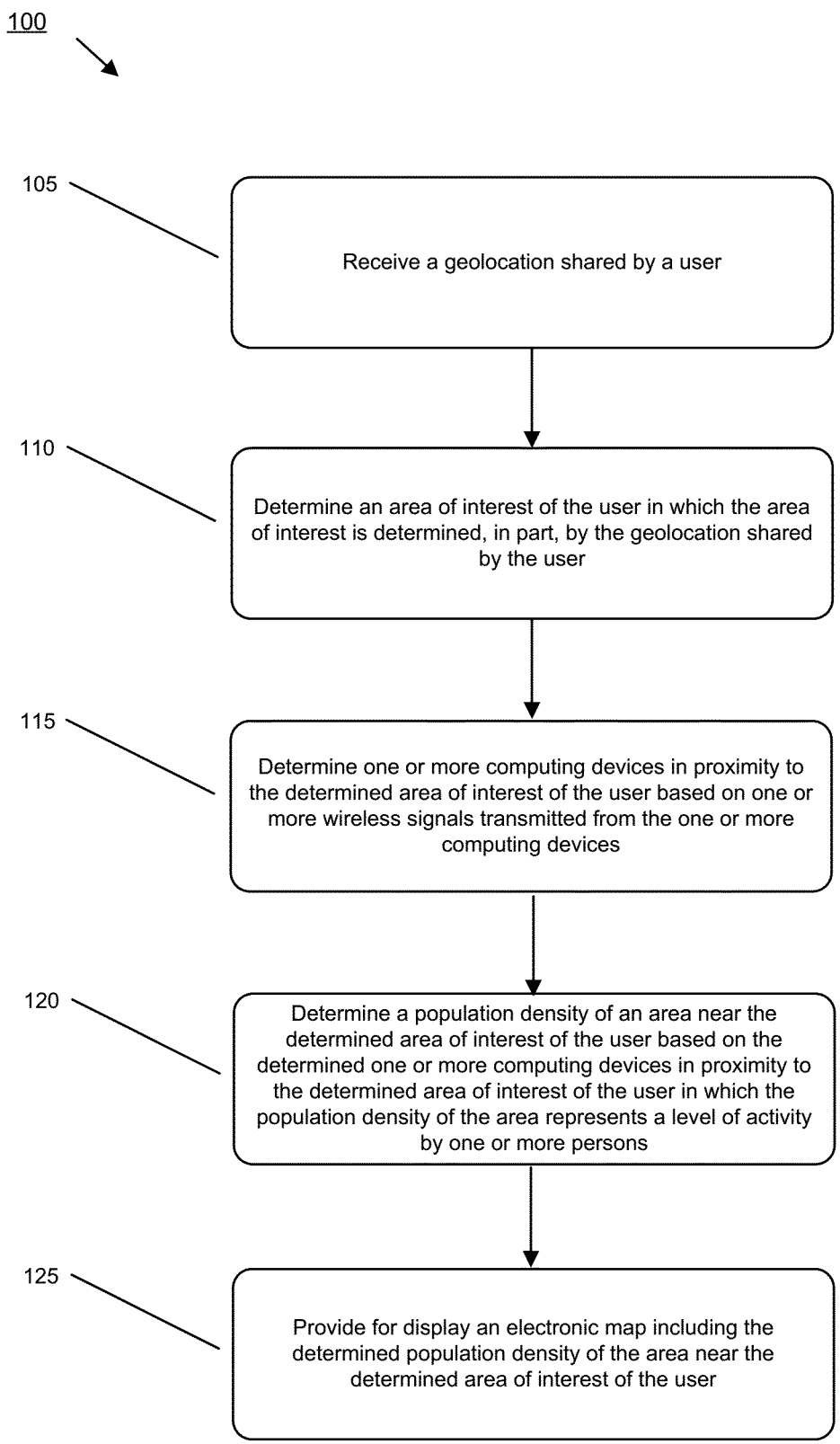
FIG. 1 conceptually illustrates an example process for determining population density of an area based at least on a geolocation of a user.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

At an event or location, it can be difficult to determine a population density of an area inside the event or location. For instance, trying to find an unoccupied bathroom at a stadium, or the shortest line for food at a mall can be a reoccurring problem for a person(s) at the event or location. Finding the least populated area can be useful for discovering one or more less densely populated areas with respect to the event or location in order to avoid a crowd or a long line. In some configurations, a user can opt-in to sharing geolocation information based on a current geolocation of the user and/or check-in activity of the user. In one example, the user can check-in to a place (e.g., restaurant, stadium, bar, grocery store, etc.) to share the user's geolocation information.

To address the aforementioned issues for determining population density of an area, based on the user's current geolocation, the subject technology can utilize one or more nearby signals transmitted from one or more devices (e.g., a cell phone, tablet computer, etc.) to determine a population density of an area near the user's geolocation. The signals from each device can include unique IDs for identifying the device associated with the ID in some configurations. By way of example, mobile devices such as cell phones constantly broadcast a cell signal (including a cell phone ID) and/or other types of signals with unique identifiers (e.g., Bluetooth, near field communication, etc.). These signals, in one example, can be anonymized to protect any personal information associated with the mobile devices transmitting these signals while still being able associate a device to a respective signal. The subject technology therefore can determine an area's population density based on these anonymized signals by detecting one or more associated devices near the geolocation of the user.

The subject technology detects the aforementioned types of signals from mobile devices in order to map one or more persons to smaller areas such as bathrooms, stores, and lines based on the user's current geolocation. In one example, the subject technology could then determine the amount of persons to the amount of space available at the event or location. Further, the subject can provide an electronic map that highlights an area(s) of high population density and an area(s) of low population density (e.g., to enable a user to determine an available bathroom(s), or if a place will be crowded).

Additionally, population density could be determined by sensors in the environment (e.g., from Wi-Fi routers or cell repeaters in the area) or from sensors built into a mobile device (e.g., cell phone). For example, if the user's mobile device was monitoring how many other cell phones were competing to communicate with a cell tower, the user's device could approximate the number of people near by and transmit this population density information to a server for processing.

Based on the determined population density of the area, businesses could use this population density information to track patron population density (e.g., a number of visitors). For instance, a store could track the amount of traffic experienced within the last few days/weeks/months, or to see if certain promotions or seasons brought higher or lower amounts of population density. In this manner, the subject technology can assist a business with managing staff availability and/or logistical decisions in order to more efficiently run the business.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, as described herein, demographic-related data may be aggregated for one or more groups of users so that an individual user(s) is not personally identifiable.

FIG. 1 conceptually illustrates an example process 100 for determining population density of an area based at least on a geolocation of a user. The process 100 is performed by one or more computing devices or systems in some configurations. For instance, a mobile application executing on a mobile device can perform the operations in the process 100 described in further detail below.

The process 100 begins at 105 by receiving a geolocation shared by a user. The shared geolocation is based on a user's current geolocation in one example. In an example in which the user has opted in to sharing location information, the user's geolocation is automatically detected in some configurations (e.g., via one or more location gathering techniques such as GPS, etc.). In another example, the user's geolocation is shared responsive to the user's check-in activity. As used herein, the term "check-in" refers to user activity that allows the user to share his or her current location to other users (e.g., in an online social network). For instance, location status updates can be provided in a social networking service to enable users to communicate a message associated with an identified geolocation of a user. In the context of a social networking service, a check-in can be understood as a post associated with a geolocation or place that is typically included in the user's profile stream.

In some configurations, the shared geolocation is associated with a physical location such as an identified place, a business, an airport, a metropolitan area, a neighborhood, a municipality, or a tourist attraction, etc. The term "place" refers to a geographic area with definite or indefinite boundaries in one example. The shared geolocation can be associated to other types of areas and still be within the scope of the subject technology. In one example, the shared geolocation is associated with an event occurring at a location.

The process 100 at 110 determines an area of interest of the user. In one example, the area of interest is determined, in part, by the geolocation shared by the user. For instance, the determined area of interest includes the geolocation of the user. The area of interest comprises a geographic area within a predetermined distance from a detected geolocation of the user. In one example, the determined area of interest of the user is associated with a place, business or event in one example (e.g., the user's geolocation indicates that the user is currently located there or within a predetermined distance near it). The geographic area includes defined or undefined boundaries, or an interior space of a structure or building. Different areas and/or rooms within the interior space of the building are included in the area of interest in one example. Additionally, determining the area of interest of the user is responsive to check-in activity of the user in one example.

The process 100 at 115 determines one or more computing devices in proximity to the determined area of interest of the user based on one or more wireless signals transmitted from the one or more computing devices. One or more wireless signals transmitted from the one or more computing devices includes at least one of a cellular signal, near field communication signal, and short wavelength radio signal. Other types of wireless signals can detected and still be within the scope of the subject technology. Determining the one or more computing devices in proximity to the determined area of interest of the user is based on the associated place, business or event (e.g., as described above) in one example. The one or more wireless signals transmitted from the one or more devices include one or more unique identifiers for associating a respective signal from the one or more wireless signals to a respective computing device among the one or more computing devices. Determining one or more computing devices in proximity to the determined area of interest of the user is further based on a Wi-Fi signal or cellular repeater signal detected from the one or more computing devices.

The process 100 at 120 determines a population density of an area near the determined area of interest of the user based on the determined one or more computing devices in proximity to the determined area of interest of the user. Determining the population density of the area near the determined area of interest is based on a threshold distance from the geolocation of the user. Further, the population density of the area represents a level of activity by one or more persons. More specifically, the population density of the area indicates an estimated number of persons present in the area. Based on the population density of the area, the level of activity is at least one of a high, medium, or low level of activity. With respect to the area, a higher population density indicates a higher level of activity, while a lower population density indicates a lower level of activity. In order to track potentially changing levels of population density, determining the population density of the area near the determined area of interest of the user occurs on a periodic basis in one example.

The process 100 at 125 provides for display an electronic map including the determined population density of the area near the determined area of interest of the user. An example graphical user interface (GUI) illustrating an electronic map is described in further detail in FIG. 3. The process 100 then ends.

Figure 2:
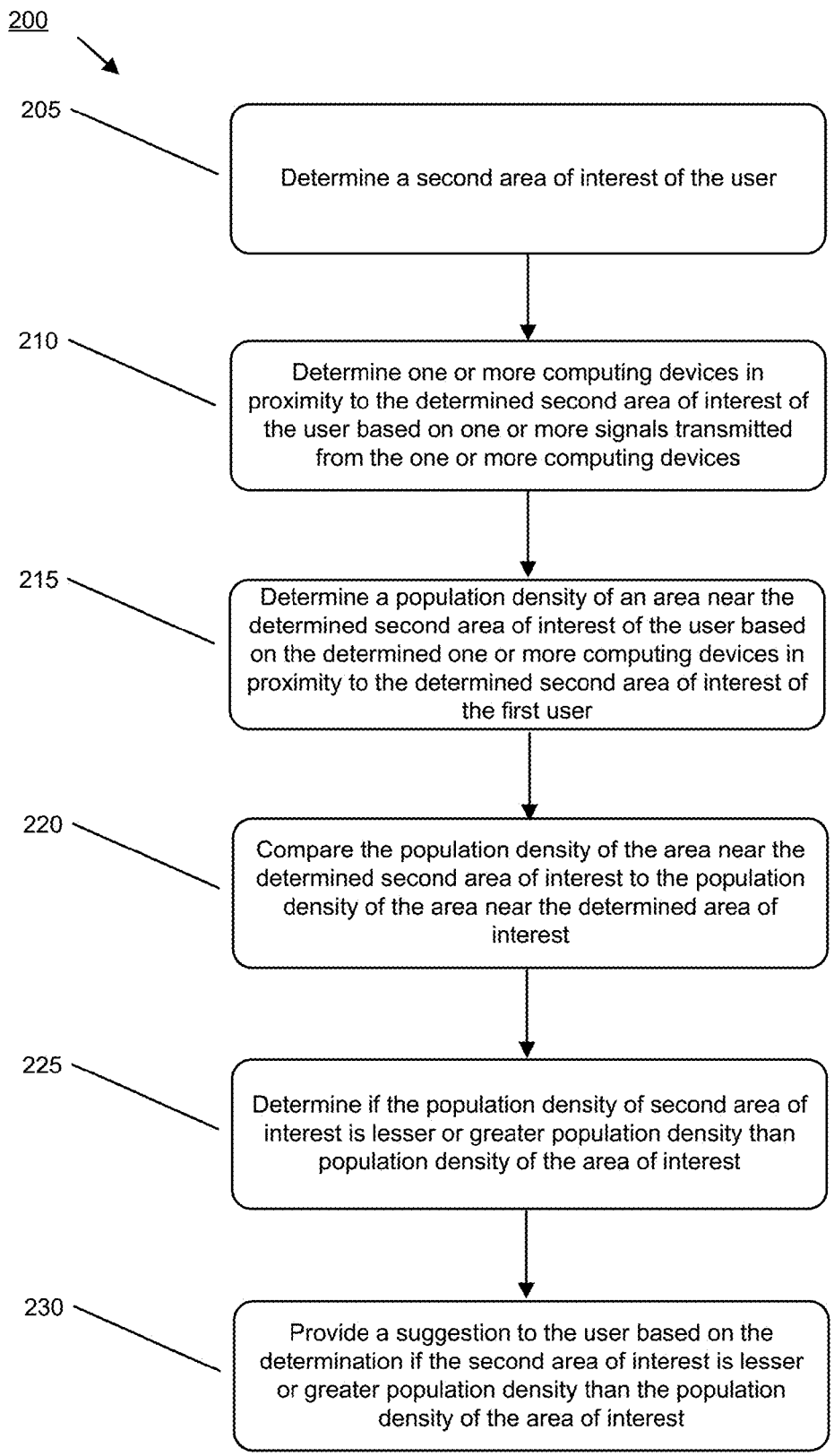
FIG. 2 conceptually illustrates an example process for comparing respective population densities between two different areas of interest in order to provide a suggestion to a user.

FIG. 2 conceptually illustrates an example process 200 for comparing respective population densities between two different areas of interest in order to provide a suggestion to a user. The process 200 can be performed by one or more computing devices or systems in some configurations. In one example, the process 200 is performed conjunctively with the process 100 described above in FIG. 1. For example, the process 200 determines a population density for a different area than the area described above in FIG. 1.

The process 200 at 205 determines a second area of interest of the user. In one example, the area of interest is determined, in part, by the geolocation shared by the user. The process 200 at 210 determines one or more computing devices in proximity to the determined second area of interest of the user based on one or more signals transmitted from the one or more computing devices. As described above, the one or more wireless signals transmitted from the one or more computing devices includes at least one of a cellular signal, near field communication signal, short wavelength radio signal, Wi-Fi signal, cell repeater signal, etc.

The process 200 at 215 determines a population density of an area near the determined second area of interest of the user based on the determined one or more computing devices in proximity to the determined second area of interest of the first user.

The process 200 at 220 compares the population density of the area near the determined second area of interest to the population density of the area near the determined area of interest. The process 200 at 225 determines if the population density of second area of interest is lesser or greater population density than population density of the area of interest.

The process 200 at 230 provides a suggestion to the user based on the determination if the second area of interest is lesser or greater population density than the population density of the area of interest. In one example, the suggestion is a message that describes a suggested route for the user. For instance, the suggestion can be a message such as, "The area near the bathroom is crowded right now. Please use the alternate bathroom on the other side of the building." In another example, the message is a notification indicating high or medium levels of population densities in order to alert the user. Other types of messages can be provided and still be within the scope of the subject technology. The process 200 then ends.

Figure 3:
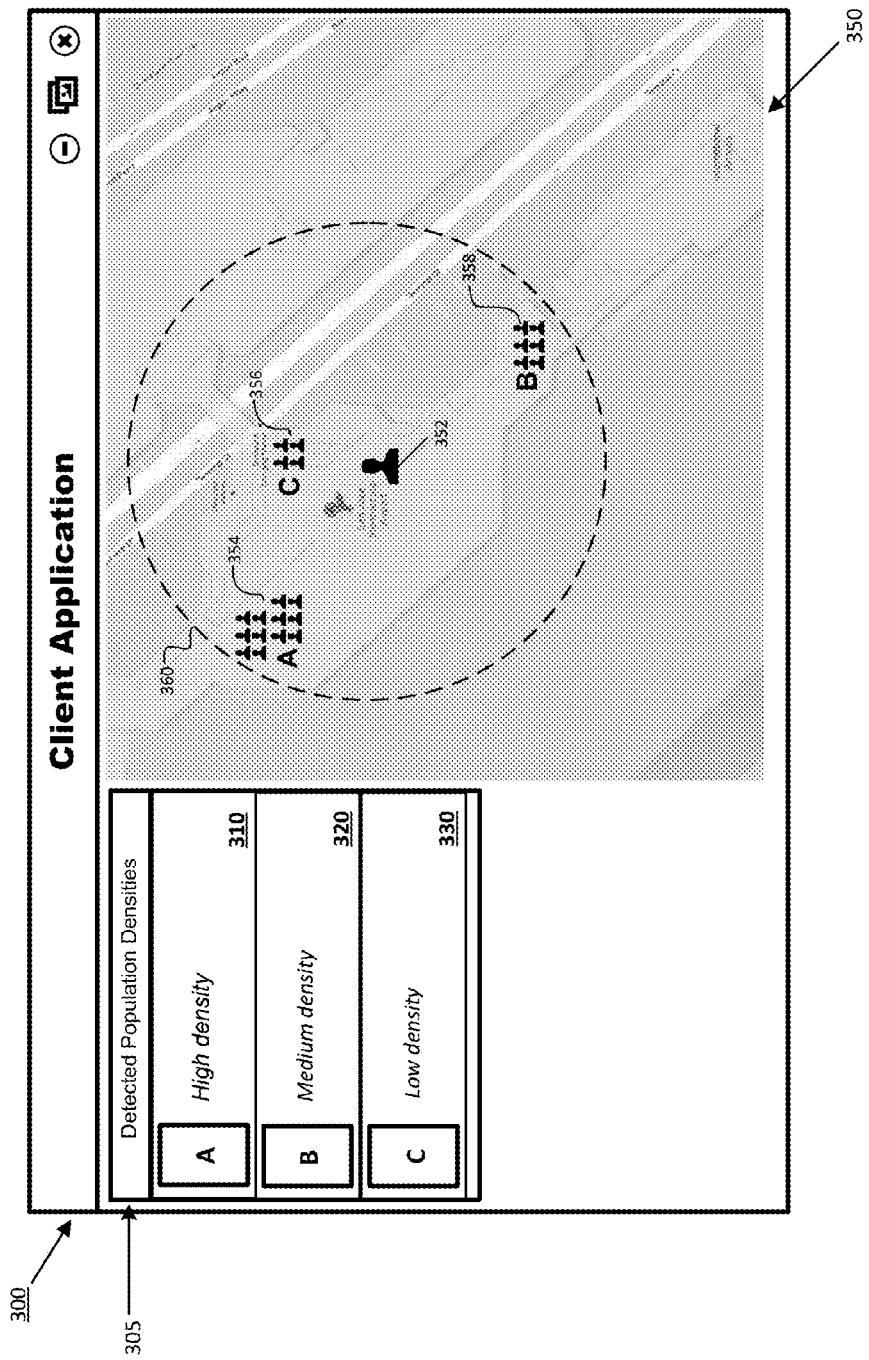
FIG. 3 conceptually illustrates an example graphical user interface (GUI) of some configurations of the subject technology.

FIG. 3 conceptually illustrates a graphical user interface (GUI) 300 in which some configurations of the subject technology can be implemented. More specifically, the GUI 300 can include different sets of graphical elements for displaying different population densities as described in FIGS. 1 and 2. A graphical element can include, but is not limited to, a button, check box, radio button, slider, list box, drop-down list, menu, combo box, icon, text box, scroll bar, etc. In one example, the GUI 300 is displayed in a client application such as a web browser, mobile application, or desktop application. The GUI 300 is provided by an online social networking service and/or online map service in some configurations.

As illustrated in FIG. 3, the GUI 300 includes a widget 305 including text display areas 310, 320 and 330. As used herein, the term "widget" refers to a lightweight application (e.g., lightweight in comparison to a full application suite or software package) providing a GUI that includes one or more graphical elements used to provide a specific application. In the example GUI 300, the display areas 310, 320 and 330 include information indicating population densities in respective areas (illustrated as areas A, B and C). For instance, each of the display areas 310, 320 and 330 include a respective message showing a population density corresponding to a respective area on an electronic map 350 described in further detail below. As shown in the example GUI 300, the messages are displayed in vertical descending order (e.g., from top to bottom) based on a level of population density (e.g., high, medium, low). Other ways to display the messages can be provided and still be within the scope of the subject technology.

The GUI 300 includes an electronic map 350 that includes an area of interest 360 as indicated by a dashed circle. The area of interest 360 defines a predetermined proximity in which one or more population density measurements can be made based on different wireless signals. In one example, the area of interest 360 is user selectable (e.g., via a touch-input selection, mouse-click selection, etc.) to increase or decrease a distance threshold in which population density measurements are provided. The electronic map 350 includes map location point 352 indicating a geolocation of a user. The electronic map 350 further includes different map areas 354, 356 and 358 (shown as areas "A," "B," and "C"). In the example GUI 300, each of the map areas 354, 356 and 358 include respective graphical representations of the population density determined in each of the map areas 354, 356 and 358. As shown, each of the map areas correspond to different areas within an interior space of a building (e.g., an airport as shown in the GUI 300) and respective population density measurements are made within the interior space of the building. In this manner, the GUI 300 can provide information related to detected populations densities for the building (and by extension, different rooms and areas within the building).

Other types of graphical representations can be utilized to indicate population density and still be within the scope of the subject technology than the example shown in the example GUI 300. Further, although the example GUI 300 illustrates one area of interest, it should be appreciated that more than one area of interest can be shown in the GUI and still be within the scope of the subject technology.

Although the example GUI 300 in FIG. 3 includes four different messages or posts, any number of messages can be included in the GUI 300 and still be within the scope of the subject technology. As further shown in the GUI 300, the button 368 is provided by the GUI 300 in order to display one or more additional messages.

Additionally, although the above description of FIG. 3 includes different example graphical elements in the GUI 300, some implementations can include other graphical elements in the GUI 300 and still be within the scope of the subject technology. Further, the GUI 300 is not required to include all of the aforementioned graphical elements.

Figure 4:
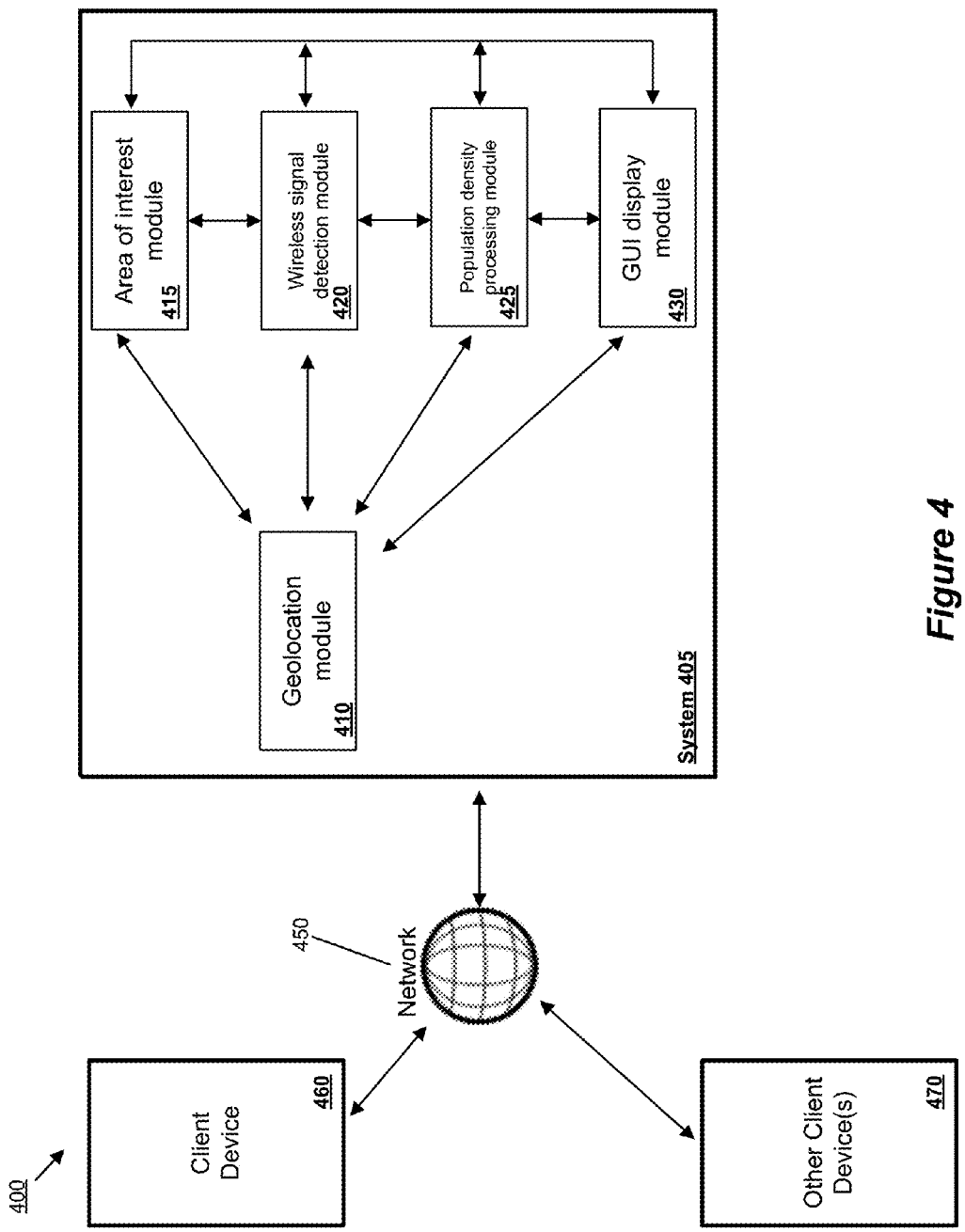
FIG. 4 conceptually illustrates an example computing environment.

FIG. 4 conceptually illustrates an example computing environment 400 including a system. In particular, FIG. 4 shows a system 405 for implementing the above described processes in FIGS. 1-2 and for providing the GUI illustrated in FIG. 3. In some configurations, the system 405 is part of an implementation running a particular machine (e.g., a server).

The system 405 can include memory, one or more processors, and one or more modules stored in memory and configured for execution by the one or more processors. As shown in FIG. 4, the system 405 includes several modules for providing different functionality. The system 405 is configured to include a geolocation module 410, an area of interest module 415, wireless signal detection module 420, a population density processing module 425 and a GUI display module 430.

The geolocation module 410 is configured to receive a geolocation shared by a user. The area of interest module 415 is configured to determine an area of interest of the user in which the area of interest is determined, in part, by the geolocation shared by the user. The area of interest includes a geographic area within a predetermined distance from the geolocation shared by the user in one example. The wireless signal detection module 420 is configured to determine one or more computing devices in proximity to the determined area of interest of the user based on one or more wireless signals transmitted from the one or more computing devices. The population density processing module 425 is configured to determine a population density of an area near the determined area of interest of the user based on the determined one or more computing devices in proximity to the determined area of interest of the user in which the population density of the area represents a level of activity by one or more persons. The population density of the area indicates an estimated number of persons present in the area in one example. The GUI display module 430 is configured to provide for display an electronic map including the determined population density of the area near the determined area of interest of the user.

In some configurations, the geolocation module 410 is further configured to determine a second area of interest of the user. The area of interest module 415 is further configured to determine one or more computing devices in proximity to the determined second area of interest of the user based on one or more signals transmitted from the one or more computing devices. The wireless signal detection module 420 is further configured to determine a population density of an area near the determined second area of interest of the user based on the determined one or more computing devices in proximity to the determined second area of interest of the first user. The population density processing module 425 is further configured to compare the population density of the area near the determined second area of interest to the population density of the area near the determined area of interest, determine if the population density of second area of interest is lesser or greater population density than population density of the area of interest, and provide a suggestion to the user based on the determination if the second area of interest is lesser or greater population density than the population density of the area of interest.

As further shown in FIG. 4, each of the aforementioned modules can be configured to communicate between each other. For instance, different data, messages, API calls and returns can be passed between the different modules in the system 405.

The system 405 can communicate over a network 450 with a client device 460. The client device 460 can each be configured to communicate with the aforementioned modules of the system 405. For instance, the client device 460 can transmit a request for determining a population density of an area of interest over the network 450 to the system 405. The system 405 can then transmit data responsive to the request (and other requests) over the network 450 to the client device 460. As further shown in FIG. 4, other client device(s) 470 can communicate over the network 450 with the system 405 in a similar manner.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 5:
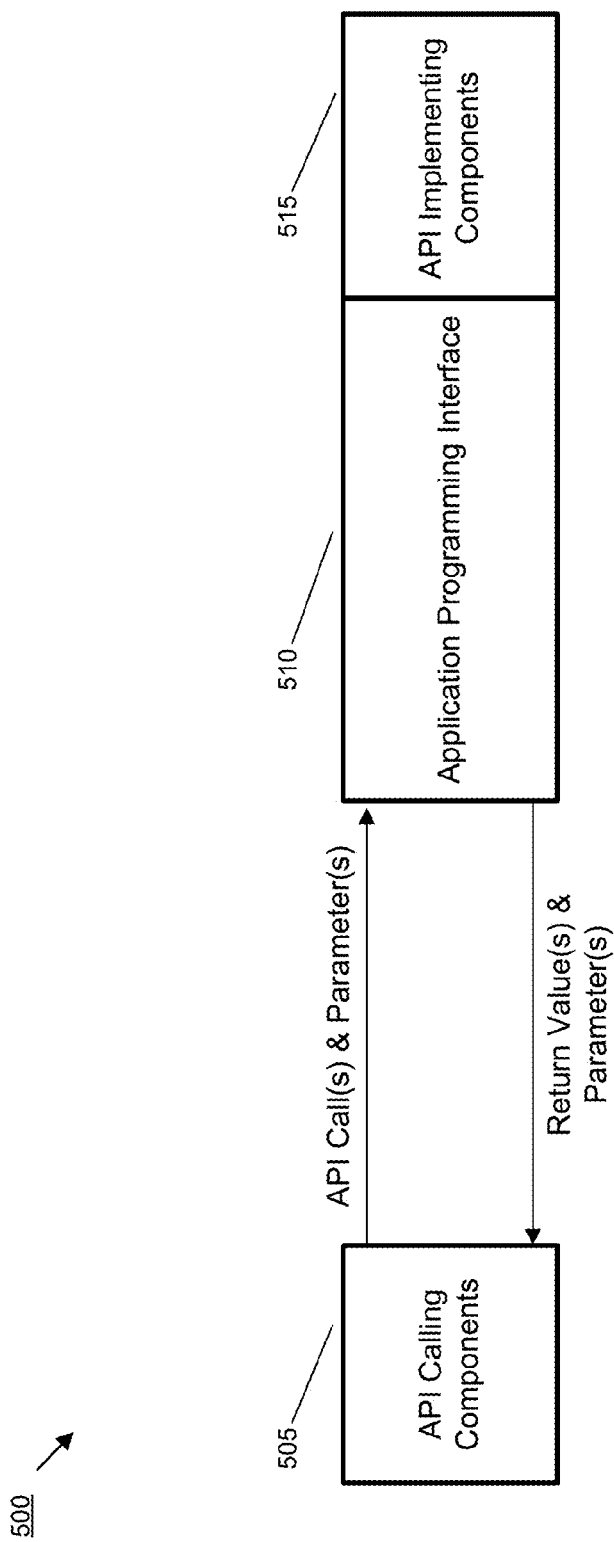
FIG. 5 conceptually illustrates an example application programming interface (API) architecture.

FIG. 5 is a block diagram illustrating an example API architecture, which can be used in some configurations of the subject technology. As shown in FIG. 5, the API architecture 500 includes the API implementing component 515 (e.g., an operating system, a library, a device driver, an API, an application program, software or other module) that implements the API 510. The API 510 specifies one or more functions, methods, classes, objects, protocols, data structures, formats and/or other features of the API-implementing component that can be used by the API-calling component 505. The API 510 can specify at least one calling convention that specifies how a function in the API implementing component receives parameters from the API calling component and how the function returns a result to the API calling component. The API calling component 505 (e.g., an operating system, a library, a device driver, an API, an application program, software or other module), makes API calls through the API 510 to access and use the features of the API implementing component 515 that are specified by the API 510. The API implementing component 515 can return a value through the API 510 to the API calling component 505 in response to an API call.

It will be appreciated that the API implementing component 515 can include additional functions, methods, classes, data structures, and/or other features that are not specified through the API 510 and are not available to the API calling component 505. It should be understood that the API calling component 505 can be on the same system as the API implementing component 515 or can be located remotely and accesses the API implementing component 515 using the API 510 over a network. While FIG. 5 illustrates a single API calling component 505 interacting with the API 510, it should be understood that other API calling components, which can be written in different languages (or the same language) than the API calling component 505, can use the API 510.

The API implementing component 515, the API 510, and the API calling component 505 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

Figure 6:
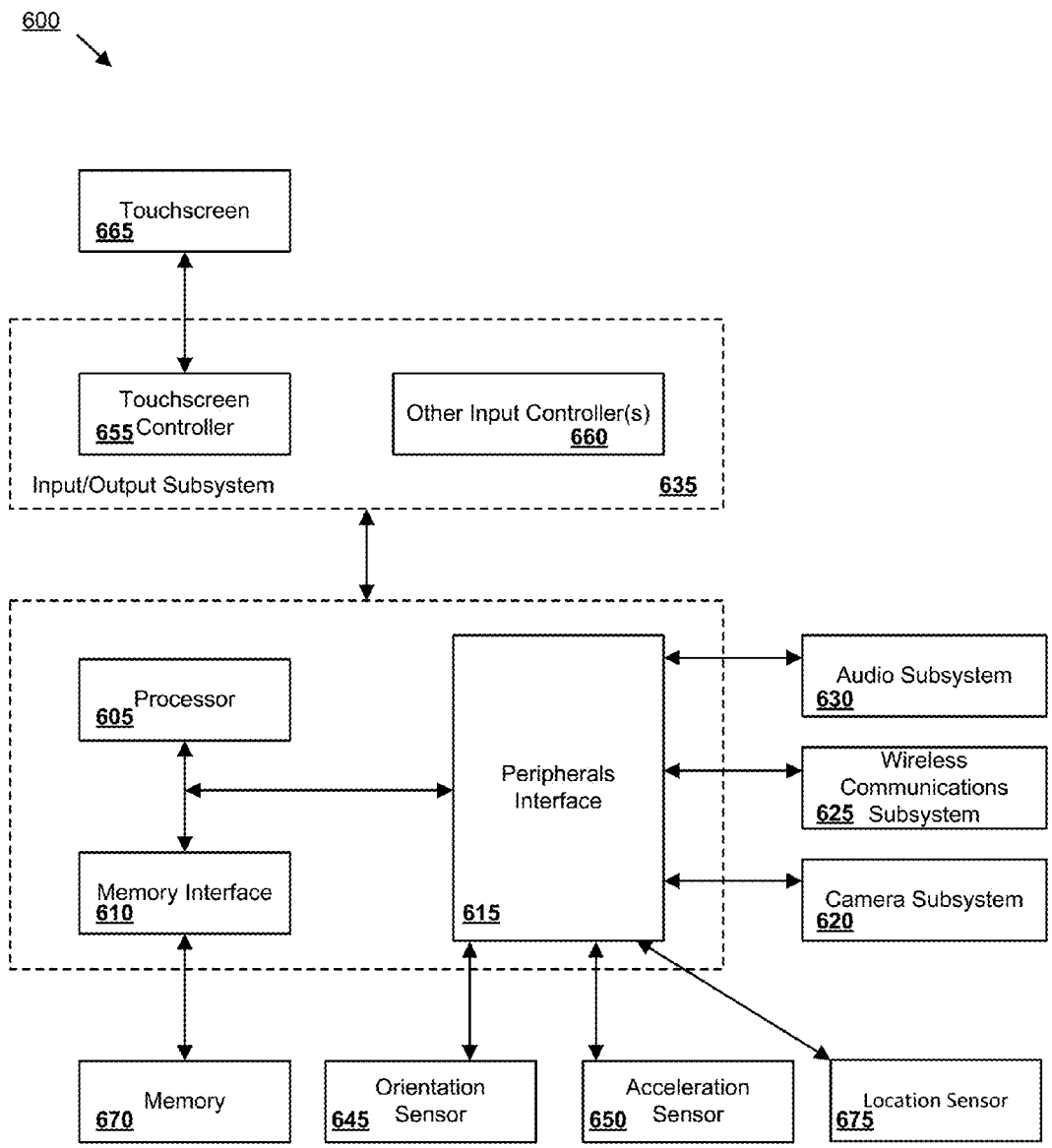
FIG. 6 conceptually illustrates an example architecture of a mobile device.

FIG. 6 is an example of a mobile device architecture 600. The implementation of a mobile device can include one or more processing units 605, memory interface 610 and a peripherals interface 615. Each of these components that make up the computing device architecture can be separate components or integrated in one or more integrated circuits. These various components can also be coupled together by one or more communication buses or signal lines.

The peripherals interface 615 can be coupled to various sensors and subsystems, including a camera subsystem 620, a wireless communication subsystem(s) 625, audio subsystem 630 and Input/Output subsystem 635. The peripherals interface 615 enables communication between processors and peripherals. The peripherals provide different functionality for the mobile device. Peripherals such as an orientation sensor 645 or an acceleration sensor 650 can be coupled to the peripherals interface 615 to facilitate the orientation and acceleration functions. Additionally, the mobile device can include a location sensor 675 to provide different location data. In particular, the location sensor can utilize a Global Positioning System (GPS) to provide different location data such as longitude, latitude and altitude.

The camera subsystem 620 can be coupled to one or more optical sensors such as a charged coupled device (CCD) optical sensor or a complementary metal-oxide-semiconductor (CMOS) optical sensor. The camera subsystem 620 coupled with the sensors can facilitate camera functions, such as image and/or video data capturing. Wireless communication subsystems 625 can serve to facilitate communication functions. Wireless communication subsystems 625 can include radio frequency receivers and transmitters, and optical receivers and transmitters. The aforementioned receivers and transmitters can be implemented to operate over one or more communication networks such as a Long Term Evolution (LTE), Global System for Mobile Communications (GSM) network, a Wi-Fi network, Bluetooth network, etc. The audio subsystem 630 is coupled to a speaker and a microphone to facilitate voice-enabled functions, such as voice recognition, digital recording, etc.

I/O subsystem 635 involves the transfer between input/output peripheral devices, such as a display, a touchscreen, etc., and the data bus of the processor 605 through the Peripherals Interface. I/O subsystem 635 can include a touchscreen controller 655 and other input controllers 60 to facilitate these functions. Touchscreen controller 655 can be coupled to the touchscreen 65 and detect contact and movement on the screen using any of multiple touch sensitivity technologies. Other input controllers 60 can be coupled to other input/control devices, such as one or more buttons.

Memory interface 610 can be coupled to memory 670, which can include high-speed random access memory and/or non-volatile memory such as flash memory. Memory 670 can store an operating system (OS). The OS can include instructions for handling basic system services and for performing hardware dependent tasks.

By way of example, memory can also include communication instructions to facilitate communicating with one or more additional devices, graphical user interface instructions to facilitate graphic user interface processing, image/video processing instructions to facilitate image/video-related processing and functions, phone instructions to facilitate phone-related processes and functions, media exchange and processing instructions to facilitate media communication and processing-related processes and functions, camera instructions to facilitate camera-related processes and functions, and video conferencing instructions to facilitate video conferencing processes and functions. The above identified instructions need not be implemented as separate software programs or modules. Various functions of mobile device can be implemented in hardware and/or in software, including in one or more signal processing and/or application specific integrated circuits.

The following description describes an example system in which aspects of the subject technology can be implemented.

Figure 7:
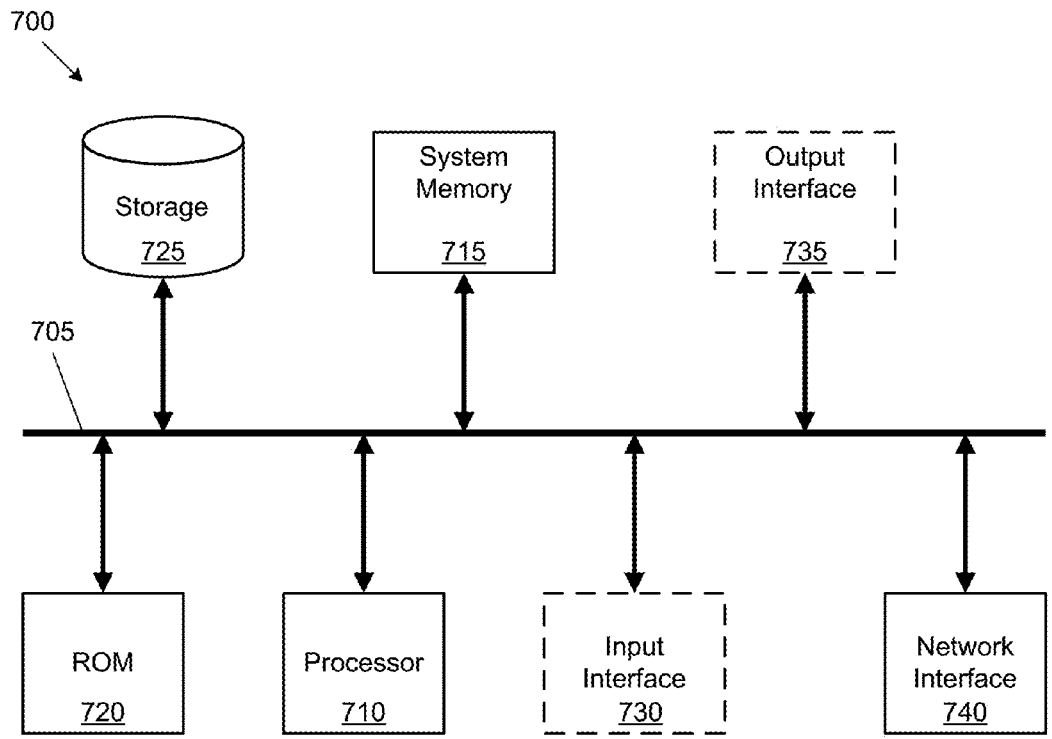
FIG. 7 conceptually illustrates a system with which some implementations of the subject technology may be implemented.

FIG. 7 conceptually illustrates a system 700 with which some implementations of the subject technology can be implemented. The system 700 can be a computer, phone, PDA, or any other sort of electronic device. In some configurations, the system 700 includes a television with one or more processors embedded therein. Such a system includes various types of computer readable media and interfaces for various other types of computer readable media. The system 700 includes a bus 705, processing unit(s) 710, a system memory 715, a read-only memory 720, a storage device 725, an optional input interface 730, an optional output interface 735, and a network interface 740.

The bus 705 collectively represents all system, peripheral, and chipset buses that communicatively connect the numerous internal devices of the system 700. For instance, the bus 705 communicatively connects the processing unit(s) 710 with the read-only memory 720, the system memory 715, and the storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the system 700. The storage device 725, on the other hand, is a read-and-write memory device. This device is a non-volatile memory unit that stores instructions and data even when the system 700 is off. Some implementations of the subject technology use a mass-storage device (such as a magnetic or optical disk and its corresponding disk drive) as the storage device 725.

Other implementations use a removable storage device (such as a flash drive, a floppy disk, and its corresponding disk drive) as the storage device 725. Like the storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the subject technology's processes are stored in the system memory 715, the storage device 725, and/or the read-only memory 720. For example, the various memory units include instructions for processing multimedia items in accordance with some implementations. From these various memory units, the processing unit(s) 710 retrieves instructions to execute and data to process in order to execute the processes of some implementations.

The bus 705 also connects to the optional input and output interfaces 730 and 735. The optional input interface 730 enables the user to communicate information and select commands to the system. The optional input interface 730 can interface with alphanumeric keyboards and pointing devices (also called "cursor control devices"). The optional output interface 735 can provide display images generated by the system 700. The optional output interface 735 can interface with printers and display devices, such as cathode ray tubes (CRT) or liquid crystal displays (LCD). Some implementations can interface with devices such as a touchscreen that functions as both input and output devices.

Finally, as shown in FIG. 7, bus 705 also couples system 700 to a network interface 740 through a network adapter (not shown). In this manner, the computer can be a part of a network of computers (such as a local area network ("LAN"), a wide area network ("WAN"), or an Intranet, or an interconnected network of networks, such as the Internet. Any or all components of system 700 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method for determining a population density of an area based at least on a geolocation of a user, the method comprising:
   receiving, by one or more first computing devices, a geolocation shared by a user;
   determining, by the one or more first computing devices, an area of interest of the user, wherein the area of interest is determined, in part, by the geolocation shared by the user;
   determining, by the one or more first computing devices, one or more second computing devices in proximity to the determined area of interest of the user based on one or more wireless signals transmitted from the one or more second computing devices; and
   determining, by the one or more first computing devices, a population density of an area near the determined area of interest of the user based on the determined one or more second computing devices in proximity to the determined area of interest of the user, wherein the population density of the area represents a level of activity by one or more persons.

2. The method of claim 1, further comprising:
   providing for display, by the one or more first computing devices, an electronic map including the determined population density of the area near the determined area of interest of the user.

3. The method of claim 1, wherein the population density of the area indicates an estimated number of persons present in the area.

4. The method of claim 1, wherein the level of activity is at least one of a high, medium, or low level of activity.

5. The method of claim 1, wherein the determined area of interest includes the geolocation of the user.

6. The method of claim 1, wherein the determined area of interest of the user is associated with a place, business or event.

7. The method of claim 6, wherein determining the one or more computing devices in proximity to the determined area of interest of the user is based on the associated place, business or event.

8. The method of claim 1, wherein determining the area of interest of the user is responsive to check-in activity of the user.

9. The method of claim 1, wherein the one or more wireless signals transmitted from the one or more second computing devices include one or more unique identifiers for associating a respective signal from the one or more wireless signals to a respective computing device among the one or more second computing devices.

10. The method of claim 1, wherein determining one or more second computing devices in proximity to the determined area of interest of the user is further based on a Wi-Fi signal or cellular repeater signal detected from the one or more second computing devices.

11. The method of claim 1, wherein determining the population density of the area near the determined area of interest is based on a threshold distance from the geolocation of the user.

12. The method of claim 1, wherein the area of interest comprises a geographic area within a predetermined distance from a detected geolocation of the user.

13. The method of claim 12, wherein the geographic area comprises defined boundaries.

14. The method of claim 12, wherein the geographic area comprises undefined boundaries.

15. The method of claim 12, wherein the geographic area comprises an interior space of a structure or building.

16. The method of claim 1, wherein the one or more wireless signals transmitted from the one or more second computing devices comprises at least one of a cellular signal, near field communication signal, and short wavelength radio signal.

17. The method of claim 1, wherein determining the population density of the area near the determined area of interest of the user occurs on a periodic basis.

18. The method of claim 1, further comprising:
   determining, by the one or more first computing devices, a second area of interest of the user;
   determining, by the one or more first computing devices, one or more third computing devices in proximity to the determined second area of interest of the user based on one or more signals transmitted from the one or more third computing devices;
   determining, by the one or more first computing devices, a population density of an area near the determined second area of interest of the user based on the determined one or more third computing devices in proximity to the determined second area of interest of the first user;
   comparing, by the one or more first computing devices, the population density of the area near the determined second area of interest to the population density of the area near the determined area of interest;
   determining, by the one or more first computing devices, if the population density of the area near the second area of interest is lesser or greater population density than the population density of the area near the determined area of interest; and
   providing, by the one or more first computing devices, a suggestion to the user based on the determination if the population density of the area near the second area of interest is lesser or greater population density than the population density of the area near the determined area of interest.

19. A system for determining a population density of an area based at least on a geolocation of a user, the system comprising:
   memory;
   one or more processors;
   one or more modules stored in memory and configured for execution by the one or more processors, the modules comprising:
      a geolocation module configured to receive a geolocation shared by a user;
      an area of interest module configured to determine an area of interest of the user, wherein the area of interest is determined, in part, by the geolocation shared by the user, the area of interest comprises a geographic area within a predetermined distance from the geolocation shared by the user;
      a wireless signal detection module configured to determine one or more computing devices in proximity to the determined area of interest of the user based on one or more wireless signals transmitted from the one or more computing devices; and
      a population density processing module configured to determine a population density of an area near the determined area of interest of the user based on the determined one or more computing devices in proximity to the determined area of interest of the user, wherein the population density of the area represents a level of activity by one or more persons, the population density of the area indicates an estimated number of persons present in the area.

20. The system of claim 19, further comprising:
   a graphical user interface (GUI) display module configured to provide for display an electronic map including the determined population density of the area near the determined area of interest of the user.

21. The system of claim 19, wherein the geolocation module is further configured to:
   determine a second area of interest of the user.

22. The system of claim 21, wherein the area of interest module is further configured to:
   determine one or more computing devices in proximity to the determined second area of interest of the user based on one or more signals transmitted from the one or more computing devices.

23. The system of claim 22, wherein the wireless signal detection module is further configured to:
   determine a population density of an area near the determined second area of interest of the user based on the determined one or more computing devices in proximity to the determined second area of interest of the first user.

24. The system of claim 23, wherein the population density processing module is further configured to:
   compare the population density of the area near the determined second area of interest to the population density of the area near the determined area of interest;
   determine if the population density of second area of interest is lesser or greater population density than population density of the area of interest; and
   provide a suggestion to the user based on the determination if the second area of interest is lesser or greater population density than the population density of the area of interest.

25. A non-transitory machine-readable medium comprising instructions stored therein, which when executed by a machine, cause the machine to perform operations comprising:
   receiving a geolocation shared by a user;
   determining an area of interest of the user, wherein the area of interest is determined, in part, by the geolocation shared by the user;
   determining one or more computing devices in proximity to the determined area of interest of the user based on one or more wireless signals transmitted from the one or more computing devices, wherein the one or more wireless signals transmitted from the one or more computing devices comprises at least one of a cellular signal, near field communication signal, and short wavelength radio signal;

determining a population density of an area near the determined area of interest of the user based on the determined one or more computing devices in proximity to the determined area of interest of the user, wherein the population density of the area represents a level of activity by one or more persons, wherein the population density of the area indicates an estimated number of persons present in the area; and providing for display an electronic map including the determined population density of the area near the determined area of interest of the user.

* * * * *